United States Patent [19]

Tanaka

[11] 4,189,170
[45] Feb. 19, 1980

[54] THREE-POINT PASSIVE SAFETY BELT SYSTEM

[75] Inventor: Akira Tanaka, Northridge, Calif.

[73] Assignee: American Safety Equipment Corporation, Encino, Calif.

[21] Appl. No.: 893,254

[22] Filed: Apr. 5, 1978

[51] Int. Cl.² ...................... B60R 21/02; B60R 21/10
[52] U.S. Cl. .................................................. 280/802
[58] Field of Search ...................... 280/745, 744, 802; 297/388, 389

[56] References Cited

U.S. PATENT DOCUMENTS

| | | | |
|---|---|---|---|
| 3,700,183 | 10/1972 | Rex | 297/388 X |
| 3,820,842 | 6/1974 | Stephenson | 297/388 X |
| 3,976,305 | 8/1976 | Fieni | 280/745 X |

*Primary Examiner*—Joseph F. Peters, Jr.
*Assistant Examiner*—Norman L. Stack, Jr.
*Attorney, Agent, or Firm*—Poms, Smith, Lande & Rose

[57] ABSTRACT

A passive safety belt system is disclosed providing both lap and upper torso belt portions adapted to provide maximum exit and entry convenience without utilization of mechanical means for pulling the belts away from the vehicle door opening. A generally Y-shaped belt is mounted at the upper door and lower door and connects for the third point to the spool of a retractor mechanism disposed in-board of the vehicle seat. The lap portion of the belt is connected to the upper torso portion by lifting straps which lift the lap portion out of the path of the occupant's legs as the occupant enters or exits the vehicle. The lap and shoulder portions are adapted to wrap in parallel combination onto the spool of the retractor to provide the necessary snugness of fit when the vehicle door is closed and the belt is in operable position. When deployed, the system provides a tight lap portion and a non-tensioned upper torso portion.

13 Claims, 6 Drawing Figures

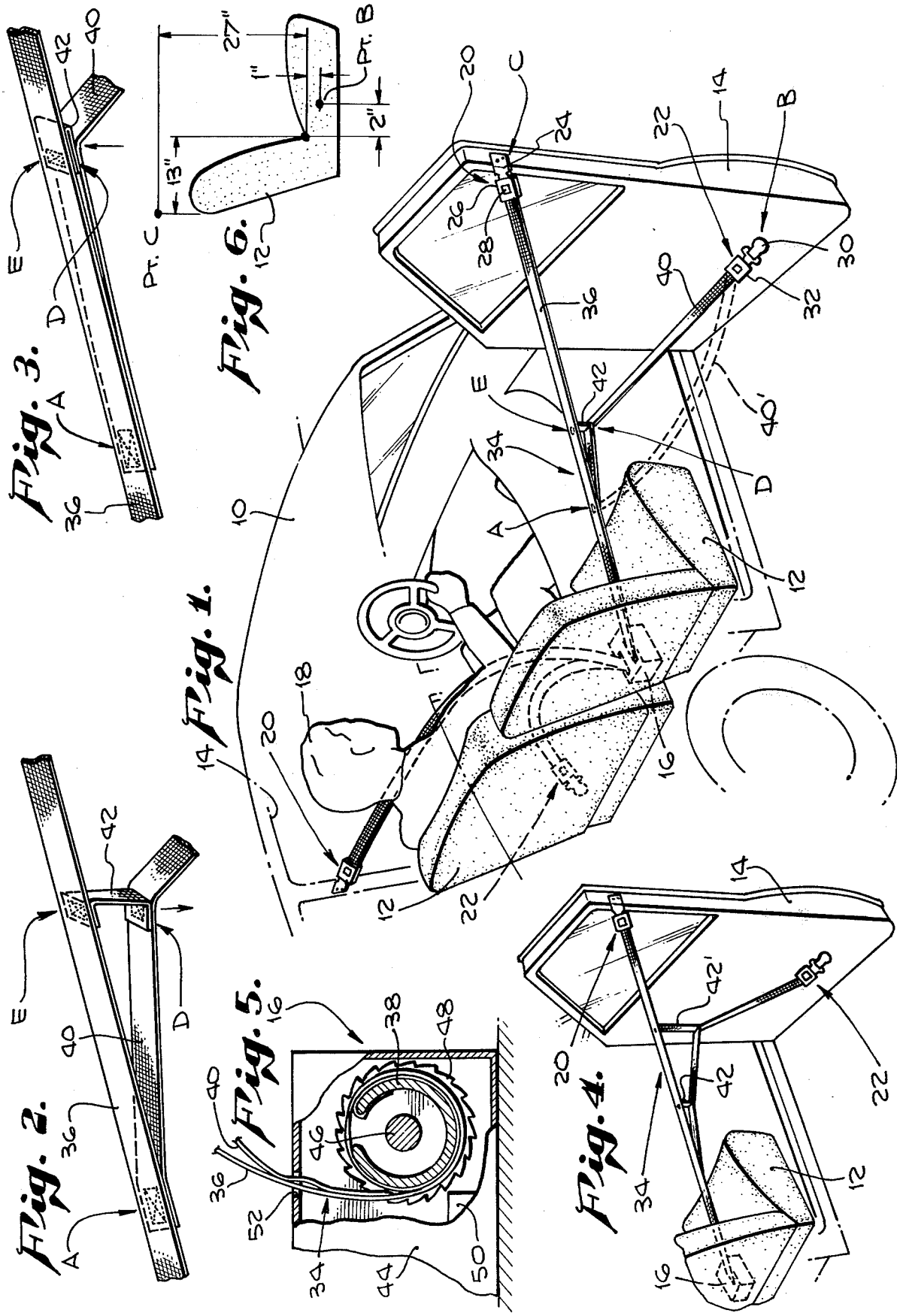

THREE-POINT PASSIVE SAFETY BELT SYSTEM

BACKGROUND OF THE INVENTION

The present invention relates to vehicle occupant restraint systems and more particularly to passive type safety belts wherein the belt is automatically positioned about the occupant as the occupant enters the vehicle and closes the door.

For many drivers and occupants of motor vehicles, a passive seat belt system is the most desirable inasmuch as the system is self-deploying upon entry to and exit from the vehicle. That is, as the occupant enters the vehicle and closes the door, the passive restraint system is automatically positioned to restrain the occupant in the event of an emergency stop or accident. Upon exit, the passive restraint system automatically removes itself.

Another feature desirable to many vehicle owners and operators is the inclusion in the restraint system of automatic adjustment for various size individuals. This is often particularly of interest in safety belt systems associated with the passenger seat where different people of different sizes many be moving in and out throughout the day.

One recent passive type restraint system is shown in the copending application of Avraham Ziv and William Hollowell entitled "Vehicle Sensing Inertia Reel Lockup Inhibitors," Ser. No. 872,306, filed Jan. 25, 1978 and assigned to the common assignee of this application. The system disclosed therein utilizes two different methods for the restraining of the upper and lower torso as has been found to be highly desirable. That is, a tensioned/lockable restraining belt system is employed across the upper torso to prevent the forward rotational movement thereof about the hip joint and a shaped pad on the dashboard of the car is employed to prevent "submarining" of the lower torso (i.e., sliding under the dash).

For various reasons such as user preference, builder preference, and applicable safety regulations, the freedom of movement which such a combined system as that of the foregoing application provides cannot always be utilized and a combined positive lap and upper torso belt system must be employed. Typically in such instances, the system employed is a so-called "three-point" system wherein a pair of belts are connected on one end to a fastener on one side of the body of the occupant extending therefrom across the lap and upper torso respectively to a pair of strategically located fasteners on the opposite side of the occupant.

A passive upper torso restraining belt as shown in the aforementioned copending application extending from a point above the occupant's out-board shoulder on the door to a point adjacent the occupant's in-board hip joint provides no hinderance to the entry and exit of the occupant inasmuch as the occupant's legs slide easily underneath the upper torso belt and the upper torso belt moves ahead of the body of the occupant during entry. By contrast, however, the addition of a lap belt portion extending from the lower door on one side to the same point in-board of the occupant causes the lap portion of the belt to droop across the opening of the door blocking entry thereto and requires two hands to enter or exit the vehicle—one to operate the door and one to lift the lap belt portion of the "passive" belt system.

Attempts at providing a workable passive lap belt not requiring such lap belt maneuvering are not new. The attempts to date, however, have attained whatever success was attained therein through the use of simple to complicated mechanical mechanisms operably carried by the seats, door, body, and/or dashboard of the vehicle in various permutations and combinations. Some relevant examples as shown in U.S. Pat. Nos. are as follows:

3,895,824 (Bauer et al) employs a lever pivotally mounted in the door of the vehicle for positioning the belt.

3,976,305 (Fieni) discloses a pneumatically or hydraulically operated variable length arm connected for actuation by the movement of the door to physically move the belt away from the door opening.

3,583,726 (Lindblad) discloses an arm carried by the door for moving the belt into and out of position as the door is closed and opened.

3,796,442 (Mauron et al) discloses a hydraulically operated arm for positioning the belt.

3,840,249 (Strom) shows another positioning mechanism employing a movable track mechanism.

3,850,446 (Hogensen) utilizes a spring loaded arm for positionally moving the belt.

In addition to the entry/exit problem, three-point systems in the past have either been of the fixed length or tensioned upper torso belt type. In the fixed length type, the length of the upper torso belt must be adjusted to the proper length for comfort by each occupant. Such a procedure is bothersome to many people—which lead to the development of the tensioned system. The tensioned system is similar to that described in the aforementioned copending application Ser. No. 872,306 wherein the upper torso belt is held by a spring-loaded spool in tension against the upper torso of the occupant. As the occupant moves, the belt protracts and retracts from the spring tension. The belt is locked against protraction in an emergency condition by an inertia sensing mechanism. Inasmuch as many people find the tensioned upper torso belt a bother, many such systems are provided with a slidable stop mechanism on the belt to provide slack by stopping the belt from retracting onto the spool past a selected point. Again, this mechanism requires adjustment and can be a source of bypassing the protection the belt provides if too much slack is maintained.

Wherefore, it is the object of the present invention to provide a passive safety belt system employing a lap portion wherein the lap portion is positionally disposed for ease of entry to and exit from the vehicle without the necessity for mechanical positioning devices as employed in the prior art to date.

It is a further object of the present invention to provide a three-point safety belt system which is automatically adjustable to various occupant sizes while providing a tight lap belt portion and a non-tensioned upper torso portion when the system is deployed.

SUMMARY

The foregoing objectives have been met in a passive safety belt system including lap belt and upper torso belt portions for a vehicle having a seat for an occupant disposed adjacent a door hingedly mounted for rotatable opening outward about a vertical axis disposed forward of the seat, wherein the improvement of the present invention comprises a lockable retractor including spool means for windably retracting a safety belt thereon and protracting said safety belt therefrom and further including means for selectively locking said spool to prevent protraction of the safety belt in an emergency, the retractor being mounted at a point substantially adjacent and below the in-board hip joint of an occupant in the seat; a first belt connector mounted to the door at a point substantially adjacent and above the outboard shoulder of an occupant in the seat; a second belt connector mounted to the door at a point substantially adjacent and below the outboard hip joint of an occupant in the seat; a first safety belt portion connected to the first belt connector on one end; a second safety belt portion connected to the second belt connector on one end; a third safety belt portion operably connected to the spool means on one end, the other ends of the first, second and third belt portions being connected in parallel at a common point to form a Y-shaped safety belt adapted for retraction onto the spool both as to the single belt of the third portion and the two-belt parallel combination of the first and second portions, the length of the first and second portions being in the same ratio as the distance from the first belt connector to the lockable retractor across the upper torso of an occupant in the seat is to the distance from the second belt connector to the lockable retractor across the lap of an occupant in the seat, the distance from the first belt connector to the common point being such that with the door open, the first and third belt portions in combination are taut and the second portion is in slack; and, means interconnecting the first and second belt portions disposed between the common point and the first and second belt connectors respectively for lifting the slack second belt portion towards the taut first belt portion when the door is opened whereby the second belt portion is lifted away from the path of the occupant's legs during entry and egress from the vehicle.

DESCRIPTION OF THE DRAWINGS

FIG. 1 is a simplified drawing of an automobile showing the present invention in its preferred embodiment.

FIG. 2 is a detailed drawing of the Y-connection point of the belt of the present invention showing the lifting means thereof in its extended position as wherein the door is open.

FIG. 3 is a detailed drawing of the Y-connection point of the belt of the present invention showing the lap and shoulder belt portions disposed against one another in parallel combination for retraction onto the spool of the retractor.

FIG. 4 is a simplified drawing of the present invention showing an alternate embodiment employing a plurality of lifting straps disposed to lift the lap belt portion away from the door opening.

FIG. 5 is a partially cut-away simplified drawing of the retractor utilized in the present invention.

FIG. 6 is a drawing of a seat dimensioned for a tested embodiment of the present invention.

DESCRIPTION OF THE PREFERRED EMBODIMENT

Referring now to FIG. 1, an automobile 10 is shown employing the safety belt system of the present invention. Automobile 10 has a pair of seats 12 disposed adjacent opposite doors 14 hingedly mounted for rotation outward in the manner shown about a vertical axis forward of the position of seats 12. A retractor 16 is disposed between seats 12 to be adjacent and below the in-board hip joint of an occupant in either one of the seats 12 such as typified by the driver 18. For convenience, the retractor 16 of FIG. 1 is a double retractor capable of retracting and protracting the belts to be hereinafter described for both the driver and occupant of the passenger seat. A pair of individual single belt retractors could, of course, be provided in side by side relationship. Further features necessary of retractor 16 for utilization in the present invention will be discussed hereinafter.

Each door 14 is provided with a pair of belt connectors generally indicated as 20 and 22 respectively. In the preferred embodiment as shown, both upper belt connector 20 and lower belt connector 22 are of the type having two segments which are releasably locked together so as to provide emergency release in the event of necessity therefor. For example, upper belt connector 20 comprises a door-mounted portion 24 and a belt-mounted portion 26 adapted for releasably mating with door-mounted portion 24 and having an emergency release button 28 contained therein. In like manner, lower belt connector 22 comprises a door-mounted portion 30 and a belt-mounted portion 32.

The safety belt of the present invention generally indicated as 34 is a generally Y-shaped belt having three portions and being interconnected in at least one place in a manner to be hereinafter described. In the preferred embodiment, a first belt 36 is connected to the belt-mounted portion 26 of upper belt connector 20 on one end and to the spool 38 of retractor 16 on the opposite end. A second belt 40 is connected to the first belt 36 intermediate the two ends thereof on one end and connected to the belt-mounted portion 32 of lower belt connector 22 on the opposite end. The point of connection between the first belt 36 and second belt 40 is designated as point A. As thus configured and shown in FIG. 1, safety belt 34 thus comprises a generally Y-shaped safety belt fastened at three points (the retractor 16, upper belt connector 20, and lower belt connector 22) comprising three portions. The first portion is that portion of first belt 36 extending between the upper belt connector 20 and point A. The second portion is second belt 40 extending between the lower belt connector 22 and point A. The third portion is that portion of first belt 36 between point A and the retractor 16. For convenience, lower belt connector is designated as point B and upper belt connector 20 is designated as point C.

The dimensions of the distances A–C and A–B are made to be in the same ratio as the desired distance for comfort of the deployed belt from C around the upper torso of the occupant to the retractor 16 (including approximately 1–2 inches extra if slack is desired) and from point B across the lap of the occupant to the retractor 16. Referring briefly to FIG. 6, the respective positioning of points C and B in a tested embodiment of the present invention is shown. The retractor 16 is positioned substantially opposite point B on the other side of the seat 12. Such positioning provides the desired lap gripping and upper torso snubbing actions required in a three-point safety belt system.

Referring once again to FIG. 1, in the aforementioned tested embodiment, the safety belt 34 was dimensioned to have portion A–C 41 inches long and portion A–B 33 inches long. With nothing more and the belt 34 dimensioned as shown, with the door in its opened position the first and third portions (retractor 16 to A plus A to C) would be under tension and the lap belt portion (A to B) would droop in the ghosted position indicated as 40'. To prevent this and accomplish the objectives of the present invention, portions A–C and A–B are interconnected by an elastic strap or thin belting material connector 42 between the points labeled D and E. The connector 42 thus lifts the slack portion A–B of belt 34 towards the upper portion A–C which is under tension to the position shown wherein it is lifted out of the path of the legs of the occupant entering or exiting the vehicle. The method of attachment of connector 42 is shown in greater detail in FIG. 2. It is worthy of note at this point that, while the embodiment being described employs a continuous belt as first belt 36 having second belt 40 connected thereto, a continuous belt could be provided between the retractor 16 and point B with a second belt connected at point A to extend to point C or, in the alternative, three belt portions could be connected at point A. The required characteristics of belt 34 and connector 42 will become more apparent from the description which follows hereinafter.

In the preferred embodiment, a single connector 42 was employed as shown in FIG. 1 with points D and E being located 11 inches from point A. Alternatively, a second (or more) connector 42' could be provided as shown in FIG. 4 in such case where the particular vehicle door opening size, door configuration, seat size, etc., requires it.

Referring now to FIG. 5, particular characteristics of the retractor 16 and the belt 34 to accomplish the objectives of the present invention will be discussed. In somewhat conventional manner, retractor 16 employs a spool 38 rotatably journaled within a housing 44 for rotation about a shaft 46. Spool 38 is connected to a toothed wheel 48 for rotation in combination therewith. An inertially activated mechanism 50 is provided to engage the toothed wheel 48 in the event of an emergency condition such as a crash or rapid stop. At all other times, inertially activated mechanism 50 allows the free movement of toothed wheel 48 and, thereby, spool 38. Alternatively, mechanism could be manually locked when in the deployed position. Spool 38 is adapted to have a seat belt affixed thereto and has a spring drive mechanism (not shown) operably connected thereto to wind the spool in one direction. Typically, the seat belt is wound around spool 38 to be protracted manually and retracted by the force of the spring. To accomplish the objectives of the present invention, housing 44 must be provided with a slot or entry 52 thereto adapted for the passage of a plurality of thicknesses of safety belt. Additionally, the spool 38 must be adapted to retract and protract multiple thicknesses of safety belt thereon and thereoff. This is necessitated by the construction and operation of the safety belt 34 previously described. Moreover, the safety belt 34 must be interconnected as to its portions and the connector 42 to fold in close adjacent parallel relationship as shown in FIG. 3 whereby the single belt portion from retractor 16 to point A cannot not only be passed through the slot 52 and wound about spool 38 but, in addition, folded, multi-layer portions A–C in combination with portion A–B and connector 42 as shown folded in FIG. 3 can pass through slot 52 and wind about spool 38 as well. Typically, actions required in modification of the retractor 16 from a normal retractor in order to achieve the above objectives will include enlarging the slot 52 and, perhaps, including a smoothed or roller edge, widening the spool 38, increasing the clearance between the spool 38 and the housing 44, and increasing the strength of the spring used to retract the spool 38.

When the belt 34 of the present invention is deployed as exemplified by the belt worn by the driver 18 in FIG. 1, it can be seen that the lap and upper torso restraining portions are retracted into the retractor 16 in combination. By so doing, the ratio of the length of the upper torso belt between upper connector 20 and retractor 16 to the length of the lap belt between lower connector 22 and retractor 16 remains constant. Thus, if the upper torso restraining portion is made 1–2 inches longer than necessary for a snug fit, the lap belt portion will be placed in tension across the lap of the occupant first, thereby stopping further retraction of belt 34 into retractor 16 while leaving the upper torso portion in slack. Since the slack is built in, it is automatically constant as the upper torso restraining portion is adjusted along with the lap belt portion to accommodate different sized occupants, but is not subject to further extension separate from the lap belt—as desired for maximum safety.

As the door 14 is opened, belt 34 is protracted from the retractor 16. In so doing, belt 34 goes from the deployed state of upper torso belt in slack and lap belt in tension to the previously described state of upper torso belt (part of the belt between the retractor 16 and upper connector 20) in tension and lap belt (the belt between A and B) in slack (but lifted) as previously described.

Thus, it can be seen that by constructing a combined Y-shaped belt and providing for the combined retracting thereof of multi-layer portions on the single spool of a retractor and including integral lifting means interconnecting the lap and upper torso portions of the belt, a passive three-point safety belt system can be provided which is self-removing of the lap belt portion from the path of entry and exit from the vehicle when the door is opened (without the necessity of resorting to mechanical contrivances as employed in the prior art) and automatic in adjusting to provide a three-point safety belt system which provides a tensioned lap belt and a slack upper torso belt in the deployed position.

Wherefore, having thus described my invention, I claim:

1. In a passive safety belt system including lap belt and upper torso belt portions for a vehicle having a seat for an occupant disposed adjacent a door hingedly mounted for rotatable opening outward about a vertical axis disposed forward of the seat, the improvement comprising:
   (a) a lockable retractor including spool means for windably retracting a safety belt thereon and protracting said safety belt therefrom and further including means for selectively locking said spool to prevent protraction of the safety belt in an emergency, said retractor being mounted at a point substantially adjacent and below the in-board hip joint of an occupant in the seat;
   (b) a first belt connector mounted to the door at a point substantially adjacent and above the outboard shoulder of an occupant in the seat;
   (c) a second belt connector mounted to the door at a point substantially adjacent and below the outboard hip joint of an occupant in the seat;
   (d) a first safety belt portion connected to said first belt connector on one end;
   (e) a second safety belt portion connected to said second belt connector on one end;

(f) a third safety belt portion operably connected to said spool means on one end, the other ends of said first, second and third belt portions being connected in parallel at a common point to form a Y-shaped safety belt adapted for retraction onto said spool both as to the single belt of said third portion and the two-belt parallel combination of said first and second portions, the length of said first and second portions being in the same ratio as the distance from said first belt connector to said lockable retractor across the upper torso of an occupant in the seat is to the distance from said second belt connector to said lockable retractor across the lap of an occupant in the seat, the distance from said first belt connector to said common point being such that with the door open said first and third belt portions in combination are taut and said second portion is in slack; and, (g) means interconnecting said first and second belt portions disposed between said common point and said first and second belt connectors respectively for lifting said slack second belt portion towards said taut first belt portion when the door is opened whereby said second belt portion is lifted away from the path of the occupant's legs during entry and egress from the vehicle.

2. The improved safety belt system of claim 1 wherein:
said interconnecting means is an elastic material.

3. The improved safety belt system of claim 1 wherein:
said interconnecting means is a piece of belting material.

4. The improved safety belt system of claim 1 wherein said second belt connector comprises:
(a) a first segment connected to the vehicle door; and,
(b) a second segment connected to the end of the first belt portion and adapted for releasable connection to said first segment.

5. The improved safety belt system of claim 1 wherein said first belt connector comprises:
(a) a first segment connected to the vehicle door; and,
(b) a second segment connected to the end of said second belt portion and adapted for releasable connection to said first segment.

6. The improved safety belt system of claim 1 wherein:
said length across the upper torso is increased from one to two inches in said ratio of the length of said first and second portions whereby when deployed with the door closed the portion of said first portion across the upper torso of the occupant is slack and the portion of said second portion across the lap of the occupant is in tension.

7. A passive safety belt system for a vehicle having a seat for an occupant disposed adjacent a door hingedly mounted for rotatable opening outward about an axis disposed forward of the seat comprising:
(a) an upper torso restraining belt connected on one end to the door at a point substantially adjacent and above the outboard shoulder of an occupant in the seat;
(b) a lap belt connected on one end to the door at a point substantially adjacent and below the outboard hip joint of an occupant in the seat, the other end of said upper torso restraining and lap belts being connected together in stacked, parallel relationship facing in the same direction;

(c) retractor means disposed at a point substantially adjacent and below the inboard hip joint of an occupant in the seat and connected to said connected ends of said belts for moving said connected ends in combination between an extended position wherein the door is fully opened and a retracted position wherein the door is fully closed and both belts are operably deployed respectively across the upper torso and lap of an occupant of the seat, said belts being of respective lengths such that said upper torso restraining belt is intention in said extended position and in slack in said retracted position and said lap belt is intention in said retracted position and in slack in said extended position; and, (d) strap means interconnecting said belts between said respective points of connection to the door and said point of connection together for lifting said lap belts toward said upper torso restraining belt as said lap belt goes slack and said upper torso restraining belt goes taut whereby said slack lap belt is prevented from drooping across the path of the occupant's legs upon entry and exit with the vehicle door open.

8. The safety belt system of claim 7 wherein:
said strap means are adapted to fold flatly between said upper torso restraining and lap belts in parallel relationship thereto as said belts are brought together in parallel close adjacent relationship.

9. The safety belt system of claim 7 wherein said retractor means includes:
(a) a spool rotatably journaled for wrapping a safety belt thereon, said spool being adapted for wrapping a plurality of belts in parallel close-adjacent stacked relationship thereon; and,
(b) connecting belt means connected to said spool on one end and in parallel end-to-end relationship with said connected together ends of said upper torso restraining and lap belts on the other end for allowing said latter named belts to move to said extended position and for wrapping said latter named belts onto said spool in parallel stacked combination to place said latter named belts in said retracted position.

10. The safety belt system of claim 7 wherein:
said upper torso restraining belt incorporates means for releasing said connection to the door.

11. The safety belt system of claim 7 wherein:
said lap belt incorporates means for releasing said connection to the door.

12. A passive three-point safety belt system for a vehicle having a seat for an occupant disposed adjacent a door hingedly mounted for rotatable opening outward about an axis disposed forward of the seat comprising:
(a) retractor means disposed at a point substantially adjacent and below the inboard hip joint of an occupant in the seat for retracting and protracting a plurality of parallel stacked belts in combination;
(b) an upper torso restraining belt connected on one to the door at a first point substantially adjacent and above the outboard shoulder of an occupant in the seat;
(c) a lap belt connected on one end to the door at a second point substantially adjacent and below the outboard hip joint of an occupant in the seat, the other end of said upper torso restraining and lap belts being connected together in stacked, parallel relationship facing in the same direction, the lengths of said upper torso restraining belt and said lap belt being in the same ratio as the distance for desired snugness from said first point to said retractor means across the upper torso of an occupant in the seat is to the distance for desired snugness from said second point to said retractor means across the lap of said occupant;

(d) means interconnecting said upper torso restraining belt and said lap belt for drawing said belts toward one another to prevent one of said belts from drooping when the other of said belts goes into tension and said one belt goes into slack, said connected ends of said belts being operably connected to said retractor means for combined protraction and retraction thereby between an extended position wherein the door is fully opened with both belts removed from the path of entry and exit of an occupant and a retracted position wherein the door is fully closed with both belts operably deployed respectively across the upper torso of an occupant of the seat and the lap of an occupant of the seat.

13. The improved three-point passive safety belt system of claim 12 wherein said drawing means comprises: strap means interconnecting said belts between said respective points of connection to the door and said point of connection together for lifting said lap belt toward said upper torso restraining belt as the door is opened whereby if said lap belt goes slack and said upper torso restraining belt goes taut said slack lap belt is prevented from drooping across the path of the occupant's legs upon entry and exit with the vehicle door open.

* * * * *